Patented Oct. 14, 1947

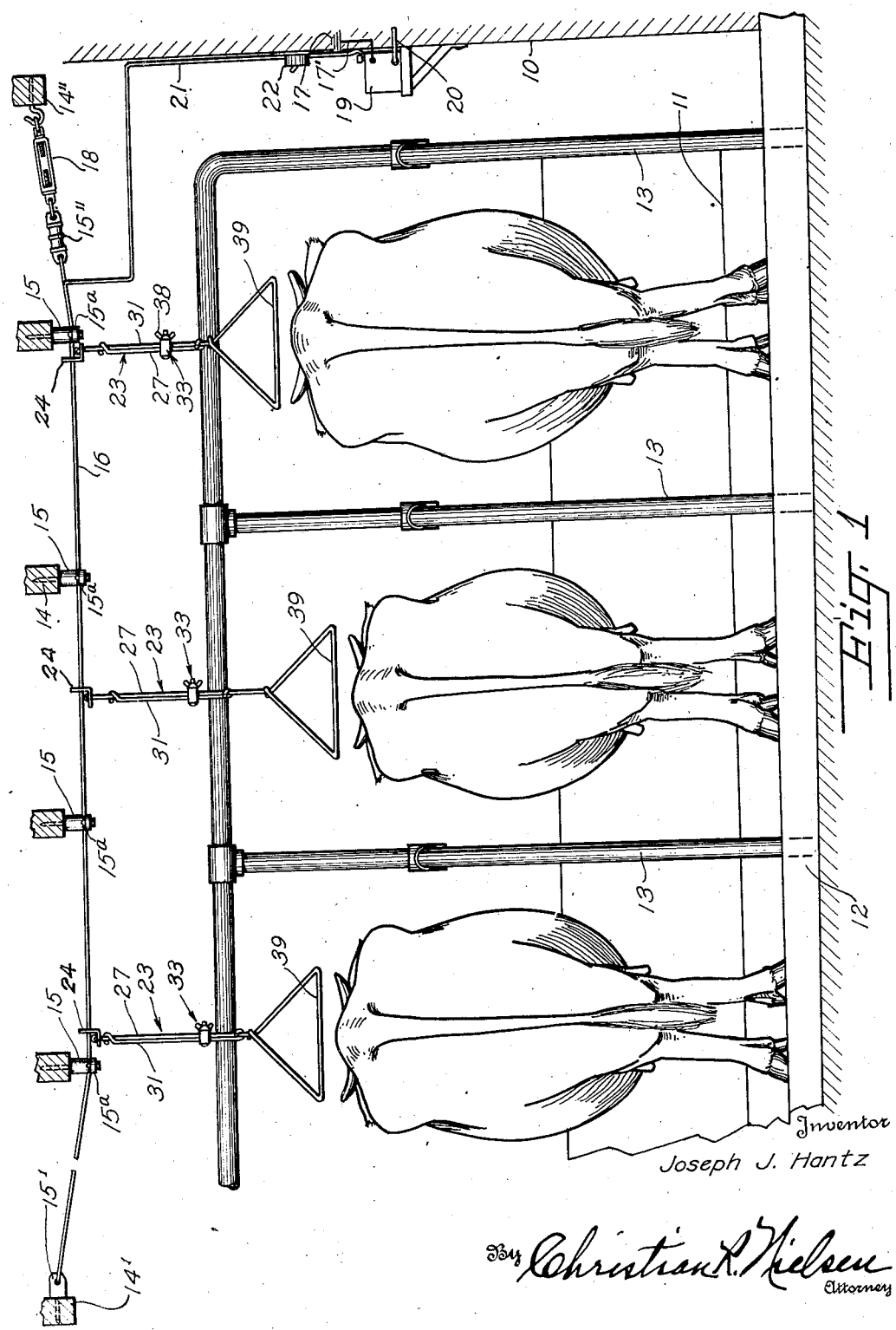

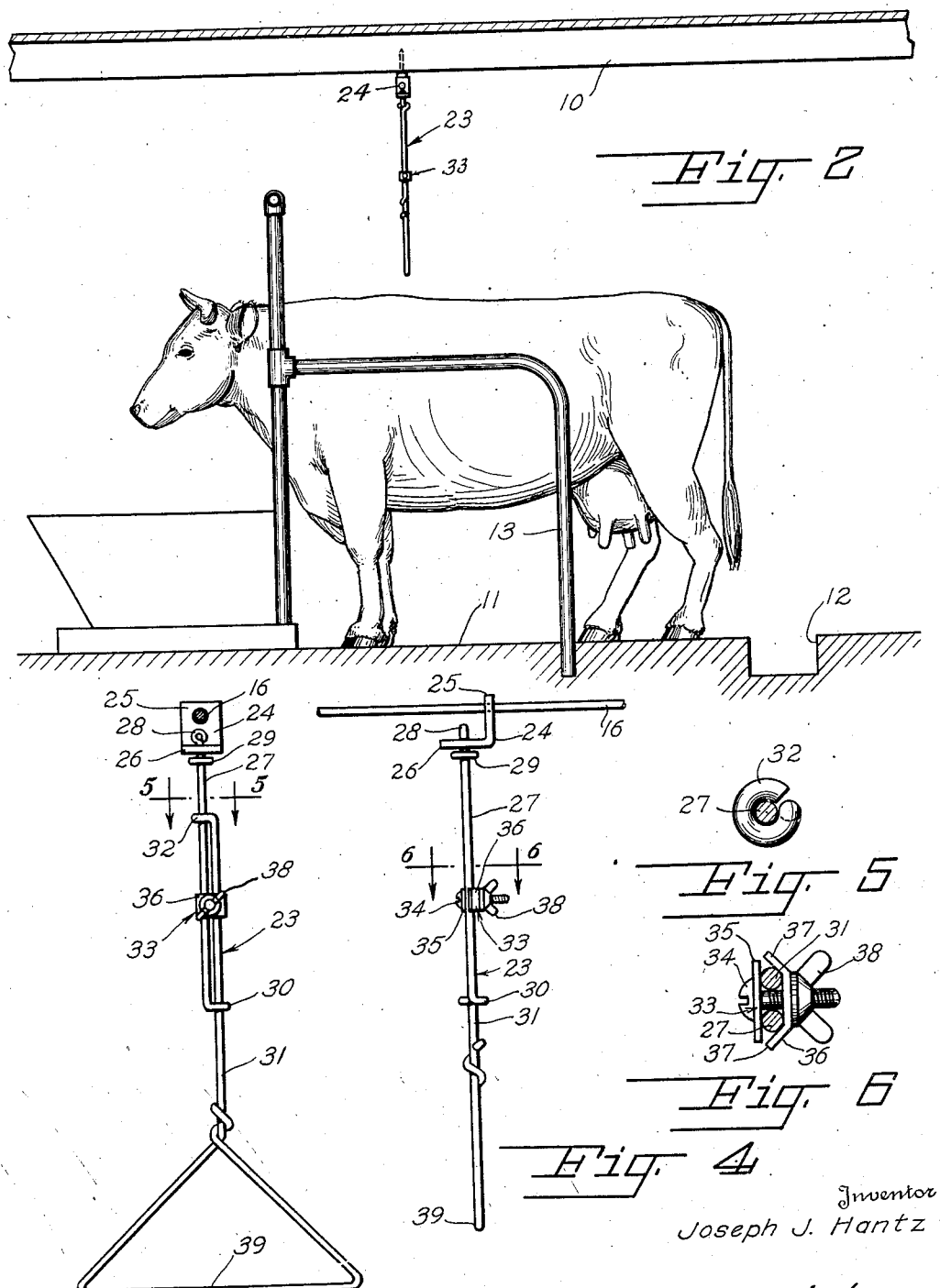

2,428,875

UNITED STATES PATENT OFFICE 2,428,875

ELECTRICAL SYSTEM FOR CATTLE STALLS

Joseph J. Hantz, Wausau, Wis.

Application January 5, 1946, Serial No. 639,451

6 Claims. (Cl. 119—27)

This invention relates to an electrical system for use in cattle stalls and it consists in the constructions, arrangements and combinations herein described and claimed.

It is an object of the invention to provide a simple and practical means to insure deposit of droppings from the animals into a gutter provided at the rear of the stalls, enabling the maintenance of a more sanitary condition of the cattle and the stalls.

More specifically, it is an object of the invention to provide an electrical system consisting of an adjustable contact member for each stall, the latter being so positioned as to be contacted by the back of an animal just before evacuation, thereby causing the animal to step backwardly in the direction of the gutter.

It is also an object of the invention to provide a simple yet practical, vertically adjustable contact member so as to be accommodatable to cattle of varying heights.

Additional objects, advantages and features of invention will be apparent from the following description considered in conjunction with the accompanying drawing, wherein Figure 1 is a rear elevation of a portion of a cattle barn having my system installed.

Figure 2 is a side elevation thereof.

Figure 3 is a front view of the adjustable contact member.

Figure 4 is a view at right angles thereto.

Figure 5 is a cross section on the line 5—5 of Figure 3.

Figure 6 is a cross section on the line 6—6 of Figure 4.

Attention is first invited to Figures 1 and 2 wherein a cattle barn 10 is shown including a plurality of stalls 11 to the rear of which there is formed a disposal gutter 12, as is customary. The stalls 11 are defined by individual stanchions 13 which will include means for confining the animals to their individual stalls, details thereof not being shown, since they form no part of the present invention, and it is sufficient to say that the confining means is of such construction as to permit the cattle to move forwardly and backwardly, as well as to lie down in the stall.

In the rafters 14 of the barn structure respective insulators 15 are secured for support of a noninsulated wire 16, one terminal end of which is anchored to an insulator 15' secured in an end rafter 14', and grounded as at 17. As shown in Figure 1, the other end of the wire is secured to an insulator 15", which in turn is connected to a turn-buckle 18 anchored to an end rafter 14"'. With the wire loosely engaged in the insulators 15, the turn buckle may be actuated to properly tension the wire 16, after which the caps 15a of the insulators may be tightened to secure the wire at the proper tension for support of contact members presently to be described.

Upon a convenient wall of the barn there is mounted a 6 volt transformer 19 connected to a suitable source of electrical energy by a lead 20. From the transformer 19 a lead 21 is extended and electrically connected to the wire 16, and in the lead 21 a switch 22 is installed.

The lead 21 and lead 17' of the ground line are insulated. Supported from the wire 16 and electrically connected therewith a plurality of contact members 23 are positioned, each being disposed so as to normally occupy a location centrally of each stall and at a suitable vertical height.

Cattle vary in size and particularly as to height, and it is therefore necessary that the contact members may be adjusted to each individual animal, the animals occupying the same stall over a period of time. It is therefore only necessary to make one adjustment of the contact member for a given animal.

For an understanding of the construction of the contact members, attention is invited to Figures 3 to 6 inclusive. An L-shaped bracket 24 is employed having right angular members 25 and 26, each of which is apertured. The aperture of the extension 25 receives the wire 16 therethrough, while the aperture of the extension 26 has a rod 27 mounted therein, the upper end of the rod 27 having an enlargement 28 for retaining the rod within the aperture in a suspended position. Slightly below the extension 26 the rod is formed with a stop 29 limiting upward movement of the rod. The lower end of the rod 27 is formed with a horizontally disposed eyelet 30 and receives therethrough a rod 31 which extends parallel to the rod 27 and in spaced relation thereto, the upper end of the rod 31 having a horizontally disposed eyelet 32 and receiving the rod 27 therethrough. From the description thus far, it will be seen that the rods 27 and 31 are interconnected in slidable relation, and in order that an adjustment may be maintained, a clamp device 33 is employed. As clearly shown in Figure 6, the clamp comprises a threaded bolt 34 upon which there is mounted a washer 35 adapted to engage upon one side of the rods 27 and 31 with the shank of the bolt extended between the rods 27 and 31. A clamp washer 36 is engaged upon the shank of the bolt, and includes a pair of angular extensions 37 bent so as to contact the rods 27 and 31 at an angle to the longitudinal axis of the shank of the bolt. A wing nut 38 is engaged upon the threaded shank of the bolt and when tightened will draw the opposed washers 35 and 36 into tight engagement upon the rods 27 and 31.

The rod 31 has the lower end thereof bent into triangular formation defining a lower horizontal contact bar 39, of substantial horizontal width for a purpose as will presently appear.

In the use of the device, in a dairy barn, for instance, where a high degree of sanitation must be maintained, a contact member 23 is suspended from the wire 16 so as to occupy a vertical medial position of each stall. The rod 31 is vertically adjusted by loosening the thumb screw 38 so that the body contact bar 39 is positioned a short distance above the back of the animal which will occupy that particular stall. The clamp device 33 is then tightened. It will be understood that the contact members will be located in a forward position within the stalls so that contact with the bar 39 will be at a forward portion of the animal normally. Normally, the animal cannot contact the bar 39, but in the act of evacuation, the back of the animal is humped into engagement with the bar 39, whereupon a slight electrical shock will cause the animal to back from the stall the necessary distance and thus maintain the stall in a clean condition.

In actual practice, it has been found that after a few days use of the device, the animals will learn to occupy rearward positions so as to not engage the contacts during evacuation and the switch 22 may be actuated to open the circuit. It will also be apparent that the contact members 23 may be moved longitudinally on the wire 16 so as to not interfere with a workman when cleaning the stalls.

While I have shown and described a preferred form of the device, this is by way of illustration only, and I consider as my own all such modifications in construction as fairly fall within the scope of the appended claims.

I claim:

1. The combination of a stall and a gutter, of an electrical wire above the stall at a position forwardly in the stall, and a vertically adjustable contact member suspended from said wire to be contacted by an animal upon upward movement of a portion of the body of the animal.

2. The structure of claim 1, in which the contact member is longitudinally movable on said wire.

3. A contact member for use in an animal stall comprising a suspension bracket having a pair of angular apertured extensions, one of said apertures receiving a bare electrical wire therethrough, the aperture of the other extension having a rod suspended therethrough, a rod arranged in parallel relation to the first rod and extending therebelow, means for adjusting the rods and securing them together in extended relation and said last named rod having a horizontal contact bar at the lower end thereof.

4. A contact member for use in an animal stall, comprising a suspension bracket having a pair of angular apertured extensions, one of said apertures receiving a bare electrical wire therethrough, the aperture of the other extension having a rod suspended therethrough, said rod having an eyelet at the lower end, a rod threaded through said eyelet and having an eyelet for reception of the first rod, said rods being in spaced parallel relation, a clamping means engageable with said rods for holding them in adjusted positions, and said last named rod having a horizontal contact bar at the lower end thereof.

5. The structure of claim 4, in which the clamping means consists of a bolt extended between said rods, a washer on said bolt in engagement with the rods, a clamp plate on said bolt in opposed relation to the washer and a thumb nut on the bolt to draw the washer and clamping plate into gripping engagement with the rods.

6. A contact member for use in an animal stall comprising a suspension bracket having means for reception of a bare electrical wire therethrough, a rod loosely connected to and depending from said bracket, a rod arranged in parallel relation to the first rod, means for adjusting and securing the rods together, and said last named rod having a horizontal contact bar at the lower end thereof.

JOSEPH J. HANTZ.

REFERENCES CITED

The following references are of record in the file of this patent:

UNITED STATES PATENTS

| Number | Name | Date |
|---|---|---|
| 1,411,312 | Swensen | Apr. 4, 1922 |
| 1,512,610 | Kolb | Oct. 21, 1924 |